Jan. 26, 1943. G. H. DOWTY Re. 22,255

AIRCRAFT UNDERCARRIAGE

Original Filed March 15, 1937 2 Sheets-Sheet 1

Inventor,
George H. Dowty
By
Atty.

Jan. 26, 1943. G. H. DOWTY Re. 22,255

AIRCRAFT UNDERCARRIAGE

Original Filed March 15, 1937 2 Sheets-Sheet 2

Inventor,
George H. Dowty
By Alex Lucie
Atty.

Reissued Jan. 26, 1943

Re. 22,255

UNITED STATES PATENT OFFICE 22,255

AIRCRAFT UNDERCARRIAGE

George Herbert Dowty, Cheltenham, England

Original No. 2,174,315, dated September 26, 1939, Serial No. 131,036, March 15, 1937. Application for reissue December 30, 1940, Serial No. 372,427. In Great Britain March 16, 1936

13 Claims. (Cl. 244—104)

Figure 1:
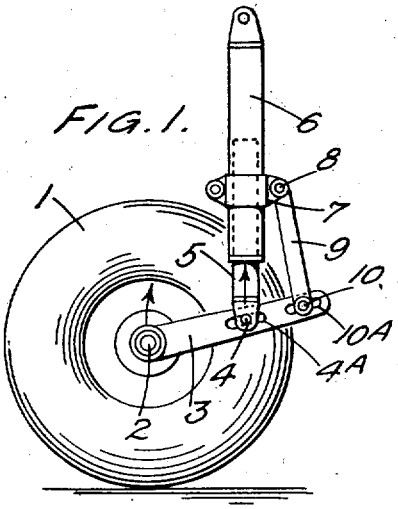

This invention relates to aircraft undercarriages, and its primary object is to provide a construction of a whole or part of an undercarriage the merit of which will be that parts and units, as complete structures, may be standardized so that the same stores may be available for a large number of different aircraft, and discrepancies arising from the different landing speeds, weights, and other factors of different aircraft, may be met by merely altering the arrangement of parts and other easily variable characteristics (initially and finally, in the design, or from time to time, in use), without the necessity for actually replacing the parts by others.

The invention also seeks to provide a convenient unitary shock-absorbing system for aircraft undercarriages capable of ready initial adjustment, or resetting, to cope with changing conditions, and one which may also be usable possibly with modification, for float or ski work.

In the broad aspect of the invention it is contemplated that the stroke of the resilient parts will be dimensionally considerably less than the required vertical movement of the wheel, and in the usual case that stroke will be mainly horizontal.

In one specific aspect the invention includes also an improved adaptation of what are commonly known as resilient wheels, according to which such wheels can be used virtually without structural alteration, and despite the comparative shortness of available stroke of their shock absorbers (imposed by constructional requirements), may be allowed a very considerable vertical component of movement under load and may be so adjusted that their shock absorbing or resilient properties are matched to the expected load. In certain cases of aircraft design it may be a desideratum that an undercarriage structure be formed of a substantially rigid frame or member and should carry a wheel as a self-contained unit, which provides the necessary resilience; such wheels, however, particularly if they be equipped for relatively low pressure tires, have very limited accommodation for internal shock absorber mechanism, and it is consequently desirable so to equip or mount them in relation to the undercarriage that despite the limited scope of the resilient means, the wheel has a sufficient vertical travel.

It will be realized that a shock absorber (particularly one for an aircraft) is a device which may have the function of dissipating energy under landing load in addition to its function of resiliently resisting taxiing loads. Always it acts resiliently to transmit such forces gently as between the sprung weight of the aircraft and the unsprung weight of the landing element (e. g. a wheel, float, ski, or skid). In some cases a shock absorber may have all these functions and capabilities; in special cases it may have only one or more thereof, and in different cases of limited functions these functions or capabilities may be different. Any such case is intended where, in this specification or in the claims, I use the terms "resilient means" or "shock absorber," or like terms, for no restriction not otherwise intended and made apparent applies to such terms, or is necessary to come within the intendment of the invention in its broad aspects.

Deflection of such a shock absorber means that yielding or change of length which accompanies its energy-dissipating, rebound-controlling, or other resilient action.

In the following specification "undercarriage structure" means the whole of what would ordinarily be understood to be a complete undercarriage, whether in itself rigid or having some degree of resilience, without the wheel, skid or float which would normally be fitted. It is, in short, the structure which extends below the aircraft for carrying the wheel or the like and it may be retractable. An essential part of such an undercarriage structure is a depending strut or leg whereon the wheel is indirectly mounted.

Where the term "wheel" is used, and where the sense permits, it is intended to be the equivalent of a float, ski, or the like, and it will be readily appreciated from the following that in several of its forms the invention is directly applicable to such devices, generally called a landing element.

"Wheel mounting" means an assembly of moving parts, or deformable frame, which attaches the wheel to the fixed, or separately resilient, parts of the aircraft, e. g. to a fixed undercarriage structure. The wheel mounting may include the lower portion of the leg as one side of such a deformable frame, or a separate fitting may fulfil an equivalent function. Where vertical wheel travel is referred to, there is meant a vertical component of wheel travel whether or not there is also a horizontal component.

Where it is stated that a wheel mounting is "horizontal" or "laterally directed," or that structural parts "extend laterally," the intended significance of the word "horizontal" or "laterally" is more nearly horizontal than vertical and almost always to imply direction or extension in a trailing manner, rather than a wheel mounting which extends sidewise, although the latter arrangement is not outside the proper scope of my invention.

In the broader aspect of the invention there is provided in or for an aircraft undercarriage a wheel mounting formed as a unit, comprising a polygonal frame (sometimes including the shock absorber or part of the shock absorber as one of its sides, and sometimes including the lower portion of the leg, or a special fitting rigid with the leg as another side), each side whereof is rigid or inflexible transversely, pivotally joined so as to be deformable under landing load against a shock absorber, or deformable by reason of yieldability or deflection of the shock absorber, if the latter or a part thereof constitutes one of the sides. In a more restricted aspect there is provision for the variation at choice, as by suitable choice of initial location or later adjustment of the positions of axes of the pivots, of the ratio between vertical wheel travel, that is to say the vertical component of wheel travel under the deforming load, and shock absorber deflection. In any case the geometry is preferably such that the actual length of shock absorber deflection is small compared with the vertical component of wheel travel—for example, in the ratio of 1 to 3, or in that order. Means may be provided for readily varying the resistance to deflection of the shock absorber, for example means whereby the inflation pressure of a pneumatic dashpot shock absorber may be readily varied. The stock absorber or a part thereof, as has been indicated, may constitute or take the place of one side of the polygonal frame, and in that case will ordinarily be a telescopic shock absorber. The frame may be triangular or quadrilateral, and various arrangements are described hereinafter and defined in the claims.

The invention also includes a combination for actual practical use which has the above features. In this combination there is an aircraft landing wheel containing a shock absorber (in manner known per se) in which one part of the shock absorber is fixed to a non-rotating hub and the other part is guided for reciprocating movement in said hub, and each part (of the absorber) is connected to a rigid side of a substantially triangular frame which is articulated for deformation and which is adapted to be attached to an otherwise complete undercarriage some part of which may form one side of the frame, the arrangement being such that deformations of the frame under landing load against the restraint imposed by the shock absorber, result in a substantially greater vertical wheel movement than shock absorber deflection.

In this combination it is preferred that the shock absorber be disposed substantially horizontally whilst the parts comprising the mounting and the manner of attachment to the undercarriage constrains the wheel to move substantially vertically. In this constructional embodiment of the invention the features detailed elsewhere may be included, e. g., means for adjusting the ratio between vertical wheel travel and shock absorber deflection, means for readily adjusting the resistance to deflection of the shock absorber, as by varying the initial air pressure therein, and other constructional features are also preferably present, such as the lateral disposition of pairs of levers forming duplicated or bilateral frames (which act in effect as if they were one frame), and a particular arrangement of links and the like for effecting the desired object. The invention embodies further characterizing features largely of a constructional nature and therefore more easily explained with the aid of the accompanying drawings.

Figure 5:
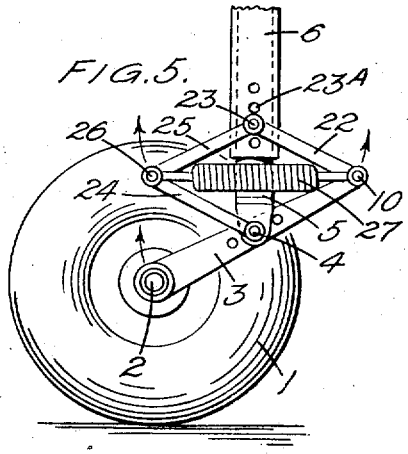
Figure 6:
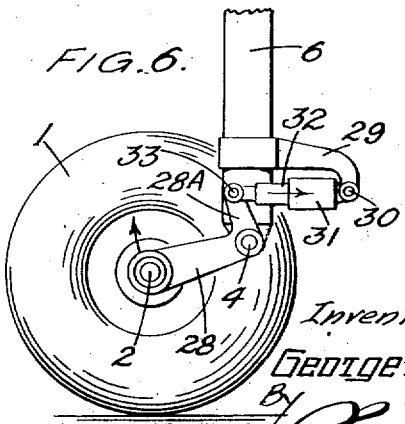
Figure 7:
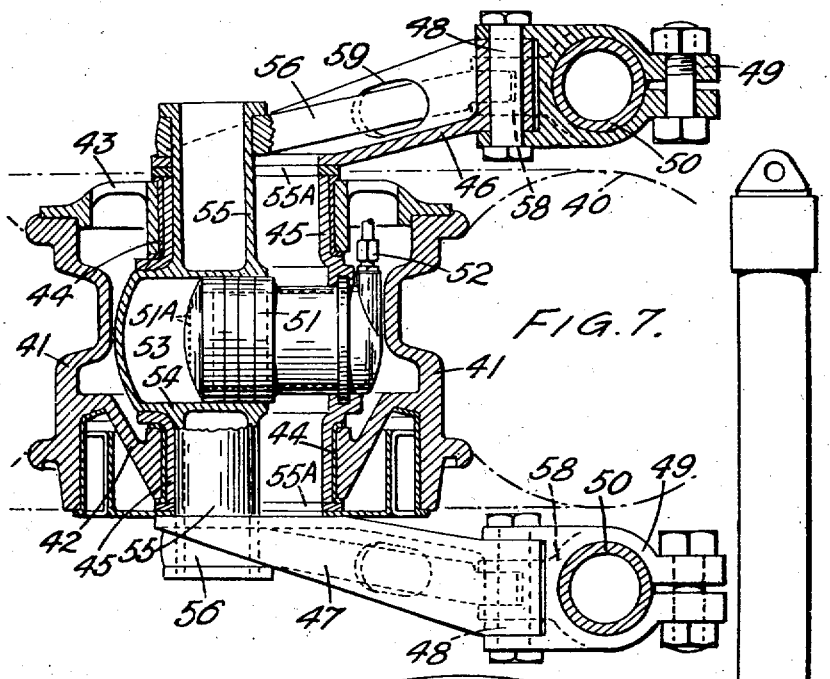
Figure 8:
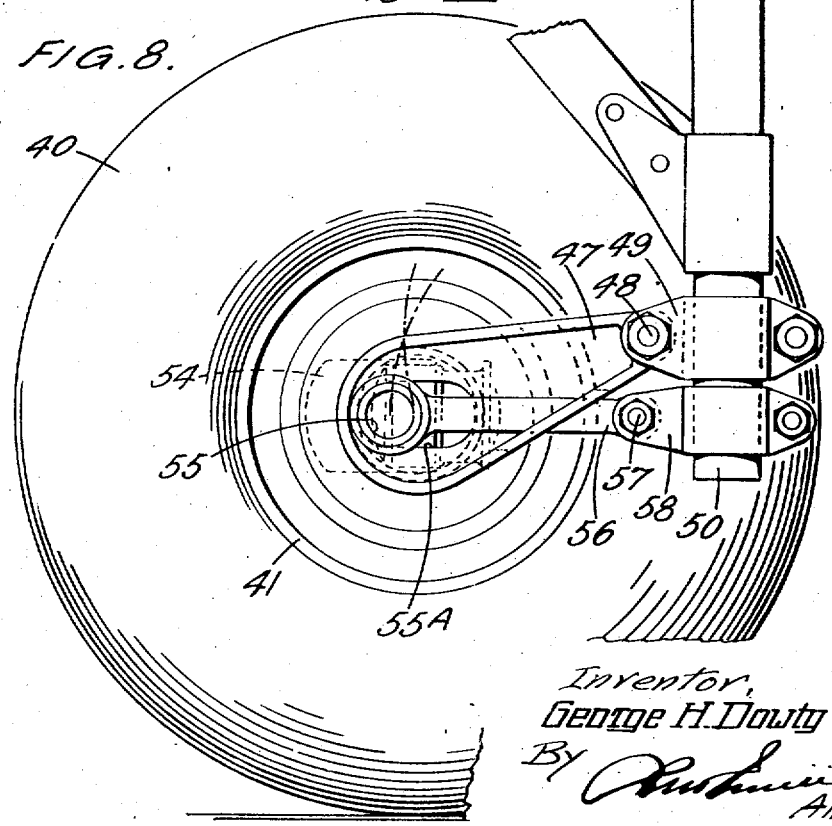

In these, Figures 1 to 6 are diagrammatic sketches of various arrangements within the invention, and Figure 7 is a diametric section through a wheel and shock absorber of an actual constructional embodiment of the invention, of which Figure 8 is a side elevation.

In Figure 1 the wheel 1 is borne at the axis 2 which is at the end of a lever 3 fulcrumed at the axis 4 to the sliding part 5 of a telescopic leg forming part of an undercarriage structure. The fixed part of the leg 6 has clipped to it by the clip 7 a pivot 8 to which there is attached a link 9 which, in its turn, is pivoted at 10 to the other end of the lever 3. The lever 3 preferably has alternative pivot positions for the axes at 4 and 10, as indicated for example at 4A and 10A, and these may be made use of to adjust the ratio between the vertical component of wheel movement under load and relative movement between the shock absorbing parts 5, 6. Other suitable arrangements to the same end may be employed, or, in lieu of choosing one of several ratios by actual adjustment, the choice may be made in the initial design from among various possible pivot locations. The clip 7 may be shifted as part of such adjustments, or as part of an independent adjustment. Any suitable means may be provided for varying the initial compression of the resilient element controlling the parts 5 and 6. It will be appreciated that the triangular figure constituted between the axes 4, 8 and 10 is an articulated triangular frame which is deformable against the resilient resistance of the shock absorber 5, 6; and constitutes the wheel mounting.

Figure 2:
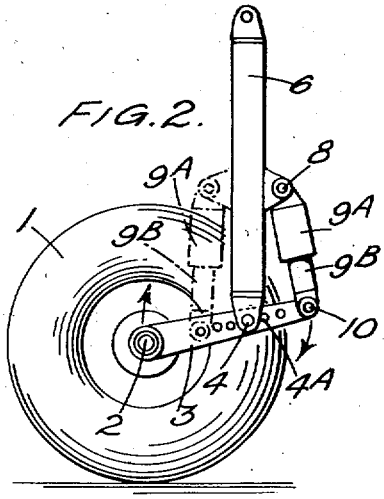

Figure 2 shows a modification wherein (similar parts being similarly indicated) there is a fixed undercarriage structure leg 6 to which is articulated at 8 the telescopic shock absorber unit comprising the two relatively slidable parts 9A, 9B, which is again pivoted at 10 to the other end of the lever 3. As drawn in full line, this shock absorber is one operating in tension, whilst in broken line it is one operating in compression. The triangular articulated frame constituted as before between the pivots 4, 8 and 10, is again rendered adjustable by the provision of additional holes such as 4A for the pivot 4, or other suitable means, and the shock absorber 9A, 9B will also be provided with means for adjusting its resistance to load.

Figure 3:
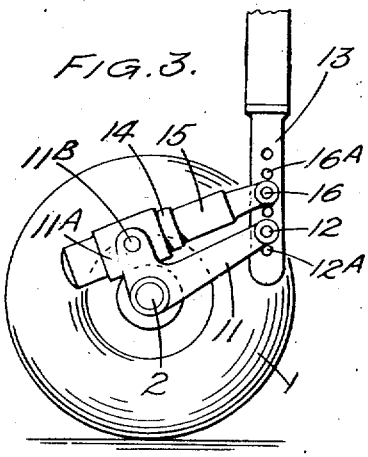

In Figure 3 the wheel axis 2 is situated adjacent the end of a laterally directed lever 11 the other end of which is pivoted or fulcrumed at 12 to the bottom end of a rigid undercarriage leg 13. The lever 11 may have a cranked portion or lug 11A which is pivotally connected at the axis 11B to one part 14 of a laterally directed telescopic shock absorber of which the second or ram part 15 is pivoted at 16 to the leg 13; the pivots 12 and 16 are virtually vertically spaced, but by materially less than the distance from either 12 or 16 to 11B, or to 2. Here again any suitable means may be provided for varying the device's ratio of movement to load, such for example as the alternative pivot positions 16A, 12A, and simultaneously with such readjustment or resetting there would be effected a corresponding increase or decrease of resistance to deflection of the shock absorber 14, 15. Its initial position, and its deflection, in any event, are generally horizontal, and its deflection, or axial travel, is less than the vertical wheel travel.

Figure 4:
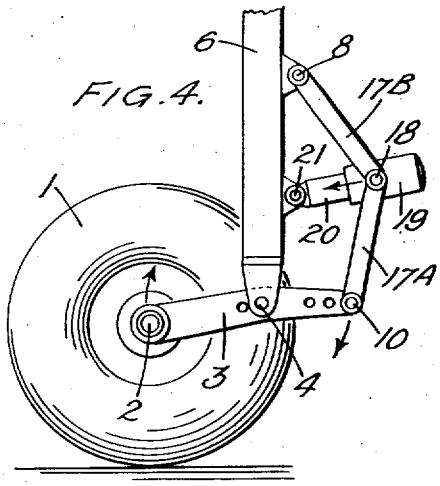

Turning now to Figure 4, the principal feature which is indicated is the possibility of a quadrilateral frame being employed, with a single toggle linkage; the wheel centre at 2 is again carried by a lever 3 fulcrumed at 4 to a fixed undercarriage leg 6 the other end of the lever 3 being articulated at 10 to one of a pair of toggle links 17A, 17B which are interconnected at the axis 18 and again pivoted to the leg 6 at axis 8. Extending across the quadrilateral formed between the centers 4, 8, 18, 10, is a compression telescopic shock absorber with its outer cylindrical part 19 articulated at the axis 18 and therefore attached to the toggle, and its inner part 20 pivoted to the leg 6 at 21. The operation of this should be sufficiently obvious, and it merely remains to be observed that such a system possibly gives greater scope for adjustment than the simpler triangular systems, because the links of the sides and the positions of the pivots, any of which can be adjusted, are more numerous.

Figure 5 shows a combination of a telescopic leg with an auxiliary shock absorber; the wheel center 2 is carried by the lever 3 which is fulcrumed at the axis 4 to the inner or sliding part 5 of a telescopic shock absorbing leg of which the outer and fixed part is shown at 6. The other end (at 10) of the lever 3 is connected by a link 22 at the axis 23 to the part 6. At the axis 4 a link 24 is connected opposite the link 22, and the link 24 is pivotally connected to the axis 23 by the link 25, and pivotal connection 26. Thus a quadrilateral is formed which is deformable in accordance with the deflections of the leg 5, 6; to enable the loading to be adjusted however, there is connected between 10 and 26 a further shock absorbing element such as 27 the characteristics of which are variable at choice. Again, there may be several ways in which the initial geometry and therefore movement ratio may be adjusted, such for example as the additional position 23A for the axis 23.

As a last example of a geometry, Figure 6 shows a wheel axis 2 supported on a lever 28 fulcrumed at 4 to a fixed undercarriage leg 6 which leg carries a laterally extending lug or bracket 29 with a pivotal attachment 30 for the stationary part 31 of a compression type shock absorber of which the ram or moving part 32 is pivoted at axis 33 to a cranked tail or lug extension 28A of the lever 28. The position of the part 29 may be adjusted vertically upon the leg 6, or there may be adjustments of the position of the axes 4 or 33 to vary the ratio of movement.

The above will suffice to indicate that the invention may be embodied in a variety of different geometries or arrangements. Figures 7 and 8 show an application of the invention of which the geometry is analogous to that of Figure 3. Further features are, however, introduced in this example, the most important of which is the feature concerning the arrangement of a telescopic shock absorber within a wheel, the shock absorber, contrary to known practice, being disposed horizontally rather than vertically. In these figures the wheel tire 40 is carried by the rim 41 which has an inward somewhat conical flange 42 integral with it, and an annular end plate 43 which is detachable, and the parts 42, 43, house the wheel bearing which is represented by the plain bush 44 upon a hollow spindle 45 which is, in effect, a non-rotating hub and which is rigidly secured at each of its ends to a pair of laterally disposed levers 46 and 47, which levers are pivotally attached by pins 48 to adjustable clips 49 secured on a fixed undercarriage leg 50. Rigidly mounted within the spindle or hub 45 and projecting thereinto radially, is a hollow piston or plunger 51 which has a readily accessible connection 52 comprising a union by which air can be introduced or released so as to pass into and inflate the piston; the piston 51 has an idle or floating piston slidable within it, separating oil from air. The piston 51 slides in a cylinder 54 with a space 53 filled with oil; the cylinder 54 is diametrically and integrally formed in a stub axle 55 which is a connecting element disposed axially across the hub 45 with sufficient space for the desired stroke of the piston and cylinder shock absorber; the element or axle 55 can reciprocate in a diametric direction to and fro across the interior of the spindle 45 in guideways 55A. The crown of the piston 51 has perforations at 51A or other porting arrangements which may be controlled by damping valves in the manner well known in the art. The piston and cylinder therefore forms in effect a pneumatic dashpot or oleo-pneumatic shock absorber, the air being the resilient medium, further compressed by the displacement of the oil. The outer ends of the axle 55 are pivotally connected to a pair of links 56 the ends of which are pivotally attached by pins such as 57 to clips 58 which like the clips 49, are attached to the legs 50. The links 56 preferably pass through clearance holes such as 59 in webs of the levers 46. The spacing of the clips 49 and 58 upon the leg 50 is readily adjustable so that the ratio between vertical movement of the wheel as a whole and resultant relative movement of the piston 51 in the cylinder 54, is variable. This spacing is usually such as to locate pivots 48 and 57 so that the effective length of arm 56 between the pivotal connection of one shock absorber part 55 and arm pivot 57 is approximately equal to three times the spacing of pivots 48 and 57, as shown in the drawings. Such effective arm length would always be at least twice the spacing of these leg pivots. As stated above and shown in the drawings, the characteristics of the arrangement of Figure 3 are the same. At the same time as making such a variation, the initial air pressure within the space 53 will be adjusted.

In this constructional form of the invention as also in the form of Figure 3 and other figures, it will be seen that, without changing or replacing any actual part or element but merely by adjustment of one sort or another, the load-carrying characteristics of the undercarriage can be altered at choice. Thus a wheel mounting formed as a unit and including the parts 46 and 56, may readily be applied to aircraft of different weights, or having different requirements, in regard to undercarriage behavior, and this should make possible a considerable economy in production and in regard to the necessity for keeping different sorts of spare parts and reserves. The example described is not to be regarded as restrictive in scope, since evidently variations and equivalents will readily suggest themselves to those skilled in the art.

What I claim as my invention is:

1. In an aircraft structure, an undercarriage, a wheel mounting comprising a rigid lever, a first pivot attachment to attach said lever to said undercarriage, a shock absorber having two relatively moving parts, a first and rigid connection between said lever and one of said parts, a rigid link, a second pivot attachment to attach said link to said undercarriage at any one of several points variably spaced from said first pivot attachment, a connection between said link and the other of said shock absorber parts, said lever and link cooperating in their angular movements about said first and second pivot attachments to deflect the shock absorber, and a bearing for rotatably attaching a landing wheel to the mounting so constituted.

2. In combination, an aircraft landing wheel, a non-rotating hub therefor, a fixed shock absorber part carried by said hub, a moving part of said shock absorber cooperating with said fixed part, means whereby said moving part is guided for reciprocating movement in said hub, a first rigid frame element attached to said hub, a second rigid frame element attached to said moving shock absorber part, spaced pivot joints between said rigid elements and an undercarriage part, and means for selectively varying the effective spacing of said joints.

3. In combination, an aircraft landing wheel, a non-rotating hub therefor, a first shock absorber part carried by said hub, a second part of said shock absorber cooperating with said first part, means whereby said second part is guided for horizontal reciprocating movement in said hub, a first rigid frame element attached to said hub, a second rigid frame element attached to said second shock absorber part, vertically spaced pivot joints between said rigid elements and an undercarriage part, and means for selectively varying the effective vertical spacing of said joints.

4. In combination, an aircraft landing wheel, a non-rotating hub therefor, a first shock absorber part carried by said hub, a second part of said shock absorber cooperating with said first part, means whereby said second part is guided for reciprocating movement in said hub, a first rigid frame element attached to said hub, a second rigid frame element attached to said second shock absorber part, spaced pivot joints between said rigid elements and an undercarriage part, means for selectively varying the effective spacing of said joints, and means for selectively varying the resistance to deflection of the shock absorber.

5. In combination, an aircraft landing wheel, a non-rotating hub therefor, a first compressed air shock absorber part carried by said hub, a relatively moving second part of said shock absorber cooperating with said fixed part, means whereby said second part is guided for horizontal reciprocating movement in said hub, a first rigid frame element attached to said hub, a second rigid frame element attached to said second shock absorber part, vertically spaced pivot joints between said rigid elements and an undercarriage part, means for selectively varying the effective vertical spacing of said joints, and means for selectively varying the initial pressure within the shock absorber.

6. In or for an aircraft undercarriage, a landing wheel, axially spaced rotating bearing parts therefor, complementary non-rotating bearing parts, a non-rotating hub carrying said non-rotating bearing parts, a piston rigid with said hub and horizontally disposed diametrically with respect to said bearing parts, a horizontal cylinder complementary to said piston, a connecting element solid with said piston, guideways in said hub for said element, levers fixed to said hub, axially externally of said bearing parts, links pivoted to said element axially externally of said bearing parts; and vertically spaced pivot attachments between said levers and pivots and the undercarriage.

7. The construction of claim 6, further comprising externally accessible means for inflating said cylinder.

8. The construction of claim 6, further comprising liquid dashpot energy dissipating means associated with said piston and cylinder.

9. The construction of claim 6, further comprising means for selectively altering the vertical spacing of said vertically spaced pivot attachments.

10. In combination a landing wheel for aircraft and the like, a non-rotating hub, a two-part telescopic shock absorber carried by the hub wholly within the length thereof one part fixed with the hub, and a supporting structure for the wheel including an element connected to the hub and a second element connected to one of the telescopic members of the shock absorber, the second element being movable angularly relative to the first element against shock absorber resistance, said elements forming a cantilever structure deformable in vertical motion of the wheel under landing load.

11. In combination an aircraft landing wheel, a non-rotating hub, a lever arm rigid with the hub and secured pivotally to a fixed element of the aircraft, a two-part telescopic shock absorber carried by and arranged wholly within the length of the hub, and a second arm operating to control one of the telescopic members of the shock absorber to vary the resistive influence of the shock absorber, said second arm being connected pivotally to said fixed element, with the arms relatively movable to predetermined shock absorber influence.

12. An aircraft landing wheel including a non-rotating hub, means secured to the hub and extending beyond and supporting the wheel, a two-part telescopic shock absorber carried by and arranged wholly within the length of the hub, one of the telescopic elements of the shock absorber being movable to predetermine the degree of the resistive shock absorber influence, and means whereby said movable element may be adjusted to predetermined shock absorber influence, the wheel supporting means and the means for controlling shock absorber influence being relatively movable for shock absorber adjustment.

13. An aircraft undercarriage comprising a landing wheel, a non-rotating hub supporting said wheel, a piston and cylinder compressed air shock absorber supported within said hub to operate substantially horizontally, a deformable articulated frame comprising rigid elements connected to the relatively movable shock absorber parts and constituting the sole means of support of the wheel, hub, and shock absorber relative to the aircraft, said shock absorber parts being constrained by said frame, and pivotal connecting means to connect said rigid elements to the airsraft structure at two different axes which are relatively immovable under landing load and both to one side of the axis of said hub.

GEORGE HERBERT DOWTY.